United States Patent [19]

Gardner et al.

[11] Patent Number: 5,819,182

[45] Date of Patent: Oct. 6, 1998

[54] METHOD AND APPARATUS FOR IMPROVING RECEIVER PERFORMANCE IN A LAND MOBILE COMMUNICATIONS SYSTEM

[75] Inventors: Steven H. Gardner, San Diego; Carl Thomas Hardin, Encinitas, both of Calif.

[73] Assignee: Pacific Communication Sciences, Inc., San Diego, Calif.

[21] Appl. No.: 556,350

[22] Filed: Nov. 13, 1995

[51] Int. Cl.$^6$ .................................................. H04Q 7/30
[52] U.S. Cl. .......................... 524/275; 455/562; 455/101; 455/135; 455/272; 375/347
[58] Field of Search ........................ 455/33.1, 33.2, 455/33.3, 33.4, 50.1, 54.1, 56.1, 59, 65, 101, 132, 133, 134, 135, 275, 272, 277.1, 277.2, 466, 524, 561, 562, 507; 375/267, 347; 371/36

[56] References Cited

U.S. PATENT DOCUMENTS

| | | | |
|---|---|---|---|
| 4,621,368 | 11/1986 | Onoe et al. | 375/267 |
| 4,868,851 | 9/1989 | Trinidad et al. | 371/36 X |
| 5,095,535 | 3/1992 | Freeburg | 455/65 X |
| 5,127,025 | 6/1992 | Okanoue | 375/347 X |
| 5,341,375 | 8/1994 | Buchholz et al. | 455/33.3 X |
| 5,390,342 | 2/1995 | Takayama et al. | 455/135 X |
| 5,463,646 | 10/1995 | Dillon et al. | 371/36 X |

*Primary Examiner*—Reinhard J. Eisenzopf
*Assistant Examiner*—Philip J. Sobutka
*Attorney, Agent, or Firm*—Baker, Maxham, Jester & Meador

[57] ABSTRACT

A method and apparatus for improving the signal-to-interference ratio and signal-to-noise ratio of a signal transmitted on a reverse channel from a mobile transmitter in a land mobile communications system by using a sectored cell in which the same channel is received by each sector of the cell. Each directional antenna is coupled to a unique associated receiver tuned to the same frequency or frequencies as the other receivers associated with each other directional antenna within the same sectored cell. Depending upon the location of the mobile end system with respect to the antenna pattern of each directional antenna, each signal will typically be redundantly received over more than one, but less than all, of the antennas. In accordance with the present invention, only one of the received signals is to be communicated from the base station to an intermediate system and all others are to be discarded. If multiple copies of the same message are received, then the control computer couples only one such copy to the intermediate system and discards each of the others.

39 Claims, 4 Drawing Sheets

| ADDRESS | MESSAGE SENT INDICATOR 407 | MESSAGE |
|---|---|---|
| 23 | X | X |
| 22 | X | X |
| 21 | X | A |
| 20 | X | B |
| 19 | X | C |
| 18 | X | D |
| 17 | X | E |
| 16 | 1 | F |
| 15 | 0 | G |
| 14 | 0 | H |
| 13 | 1 | I |
| 12 | 1 | J |
| 11 | 0 | K |
| 10 | 1 | L |
| 9 | X | X |
| 8 | X | X |
| 7 | X | X |

302 →

← STORE NEXT 401

← READ NEXT 403
← CHECK INDICATOR 404

← END OF ID LIST 405

X = DO NOT CARE

FIG. 4

METHOD AND APPARATUS FOR IMPROVING RECEIVER PERFORMANCE IN A LAND MOBILE COMMUNICATIONS SYSTEM

BACKGROUND OF THE INVENTION

1. Field of the Invention

This invention relates to wireless communication systems, and more particularly to a method and apparatus for improving signal-to-interference ratio of a reverse channel received at a base station within a land mobile communications system.

2. Description of Related Art

It has long been a goal of communications engineers to establish a mobile communication network that would allow an individual to maintain wireless communications with other individuals. That goal is being realized today by a mobile cellular communication system, commonly referred to as Advanced Mobile Phone Service (AMPS), in which a geographic area is divided into cells. In addition to AMPS, a Cellular Digital Packet Data (CDPD) system has been implemented to allow wireless communication of digital data over selected AMPS channels when those channels are not otherwise in use. A typical cell in a cellular system may be sectored or omni-directional. A base station associated with each cell controls airlink access to, and from, mobile end systems (which may be mobile/cellular phones or mobile computer systems). In an omni-directional cell, a single antenna within the base station is used to establish an air link to all mobile end systems within the cell. An omni-directional antenna provides nominally equal antenna gain for signals originating from any direction in the horizontal plane. It should be understood by those of ordinary skill in the art that what is commonly referred to as an omni-directional antenna in the cellular communication arts does not provide gain above or below the antenna, in contrast to what is implied by the name.

In a sectored cell, the coverage may be divided among several antennas that serve different regions of the cell. Typically, three to six sectors are used within a sectored cell. A cell which has three sectors has three directional antennas and three base stations, each of which is generally centered within the cell and covers approximately 120°, or one third of the horizon. Each sector within the cell is assigned a channel or set of channels for use, none of which are assigned to the other sectors of the cell. This assignment scheme prevents signals in one sector from interfering with those in another sector.

FIG. 1 illustrates a number of sectored cells 102 arranged to cover a relatively large geographic area. FIG. 2 illustrates one such sectored cell 102. The cell 102 shown in FIG. 2 has three sectors 103, each of which is serviced by a corresponding one base station 101a, 101b, 101c having an independent directional antenna. The gain characteristics (or antenna pattern) of the particular antenna used to receive from, and transmit to, mobile end systems determines the size and shape of a sector (i.e., the "footprint" 105 of the sector). Sectored cells are advantageous, in that for signals originating in the main lobe, the gain of directional antennas used in each sector is typically about 5 dB greater than the gain of a omni-directional antenna. In addition to having greater gain with regard to signals that originate within the main lobe of the directional antenna, interference that originates from sources outside the main lobe of the antenna is significantly reduced (such as signals originating from other cell cites which are using the same frequency). Thus, in general, the overall signal-to-interference ratio of a cell using sectored directional antennas is typically far greater than for the same cell using an omni-directional antenna.

As such, sectored antennas are commonly used to aid in interference control in cellular communications systems. The frequency channels assigned to a given sector of a cell are typically also assigned to other sectors of other cells, where the sectors in which these channels are reassigned are separated by as great a distance as possible, given the limited total number of channels available, the number of channels that must be supported by each cell and the amount of interference that the system can tolerate. Cells using the same frequency typically interfere with each other to some extent, depending on how far apart they are spaced. However, as long as the separation is sufficiently great, the interference will be small enough to allow acceptable performance. By using sectored antennas, the system can be designed to have no gain (or even substantial loss) in a relatively wide range of directions in which there are many potential interferers, and to have greater gain in a limited range of directions in which there are fewer interferers. This improves system performance, but it generally requires that additional channels be available to be assigned to additional directional antennas within each cell in order to supplement the coverage provided by any one directional antenna, and thus permit coverage over each entire cell. In cellular voice systems there are generally many channels available for use at each base station, so that dividing the available channels among the three sectors is an acceptable constraint.

However, in some cases there is insufficient bandwidth to assign more than one channel to a base station. For example, the total frequency bandwidth recently allocated by the Federal Communications Commission for narrowband personal communication systems (PCS), such as pagers, is 500 kHz for receive frequencies and 500 kHz for transmit frequencies. It is common for PCS service providers to assign channels of either 50 kHz or 12.5 kHz (resulting in only 39 channels, if all are 12.5 kHz wide). Of the total available bandwidth allocated for PCS systems, only a portion is allocated to any one service provider. The limited number of channels that are available for use by a PCS service provider makes it impractical to use the sectoring approach used by conventional cellular systems at PCS frequencies. For example, assume that one service provider has a license for 100 kHz for use as forward channels, and 100 kHz for use as reverse channels, that service provider would have control of up to 8 channels, each being 12.5 kHz wide. However, in order to provide a "guard band" between the frequencies controlled by that service provider and the frequencies controlled by other entities, only seven 12.5 kHz channels would typically be used by such a service provider, with half of the eighth channel (i.e., 6.25 kHz) being used as the upper guard band and the other half being used as a lower guard band. With only seven channels available, it is impossible to use sectored base stations which each require three channels. Therefore, in PCS systems, it is often necessary to use one channel to cover the entire horizon. As such, a single omni-directional antenna is used. As a result, the gain of the antenna is less than is would if a directional antenna were used, and each antenna also captures much more interference. Accordingly, the signal-to-interference ratio is poorer.

Therefore, in spite of the fact that there are fewer frequencies available for use in PCS systems than is necessary to implement a system using sectored cells, it would be desirable to provide a narrowband PCS system having the advantage of improved gain and signal-to-interference ratio normally achieved by base stations in systems using sectored cells.

SUMMARY OF THE INVENTION

The present invention is a method and apparatus for improving the signal-to-interference ratio of a signal transmitted on a reverse channel from a point source over a land mobile communications system by using a sectored cell in which the same channel is received by each sector of the cell. By using a sectored cell in which each sector of the cell receives the same channel, improved signal-to-interference derived from use of a directional antenna is realized without the need for each antenna to be associated with a unique receive channel. Thus, the benefits of a sectored cell can be achieved in a system with fewer available channels than are required for a system using conventional sectored cells.

Each directional antenna is coupled to a unique associated receiver tuned to the same frequency or frequencies as the other receivers associated with each other directional antenna within the same sectored cell. Depending upon the location of the mobile end system with respect to the antenna pattern of each directional antenna, each signal will typically be redundantly received over more than one, but less than all, of the antennas. In accordance with the present invention, only one of the redundantly received signals is to be communicated from the base station to an intermediate system and all other copies are to be discarded.

Initially, each received message is demodulated, and if the signal comprises digital data, error correcting and detecting decoding are performed. In the preferred embodiment of the present invention, if the error detecting decoding process indicates that the error correcting decoding has produced an error free message, the message is coupled to a control computer. The control computer formats the message into a data stream to be sent to a central router for the wireless system, referred to as the Intermediate System. The intermediate system then routes the data to an appropriate public or private data network.

The control computer also determines whether duplicate copies of a message have been received by any of the other sectors. Duplicate copies are discarded if present. In the preferred embodiment, messages are considered to be duplicates if each message is received within the same time slot and carries the same information. In an alternative embodiment, since each mobile end system is preferably capable of sending only one message at a time, if each message originates from the same mobile end system and is received simultaneously, the messages are considered duplicates. In yet another alternative embodiment, a determination that messages are the same may be made by decoding a message identification code embedded within each message. If each message identification code is unique, then two messages carrying the same message identification code can be assumed to be the same. In systems employing error detection, it may be possible to simultaneously receive error free messages from more than one mobile end system. In this case, the control computer routes both messages to the intermediate system.

In accordance with another embodiment of the present invention, in systems in which no error detection mechanism is present, such as AMPS or some time division multiple access (TDMA) systems, the message to be communicated to the intermediate system is selected based upon performance metrics such as signal strength, or signal-to-interference ratio.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

FIG. 4 is an illustration of a section of memory within the control computer.

Like reference numbers and designations in the various drawings refer to like elements.

DETAILED DESCRIPTION OF THE INVENTION

Throughout this description, the preferred embodiment and examples shown should be considered as exemplars, rather than limitations on the present invention.

Figure 1:
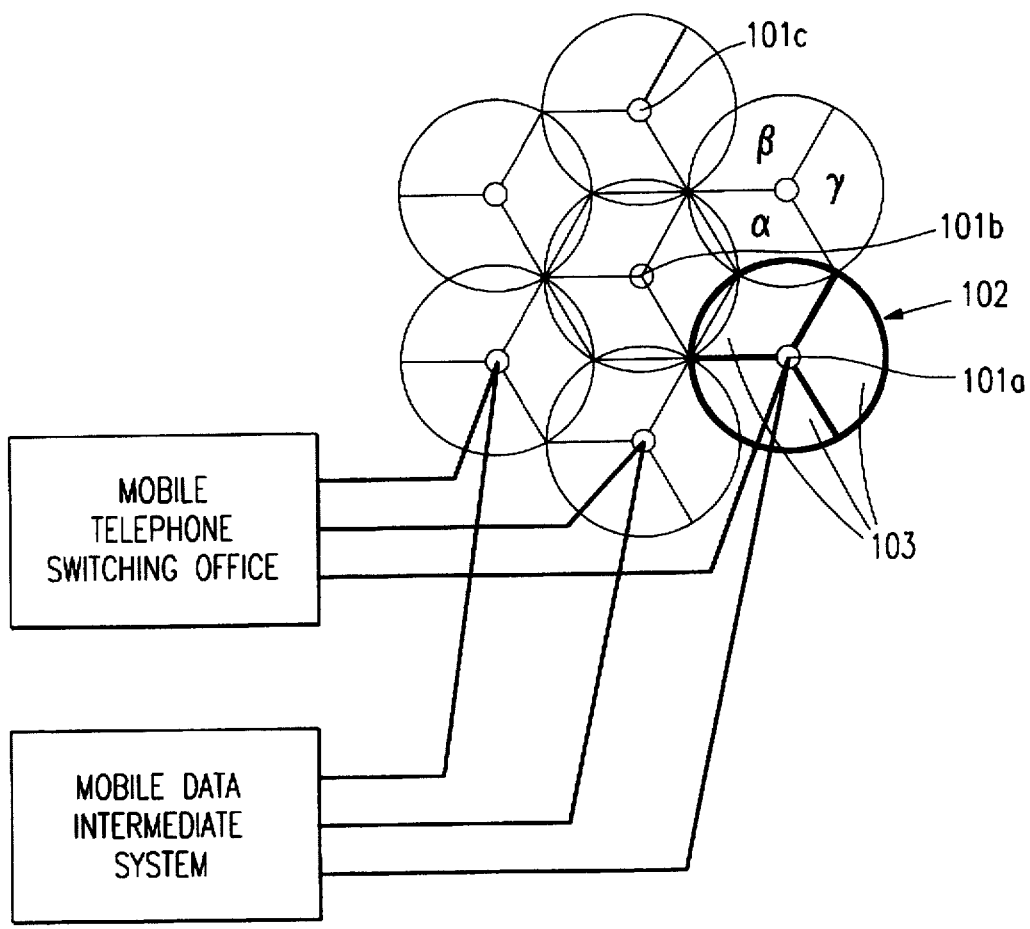
FIG. 1 illustrates a number of sectored cells arranged to cover a relatively large geographic area.
Figure 2:
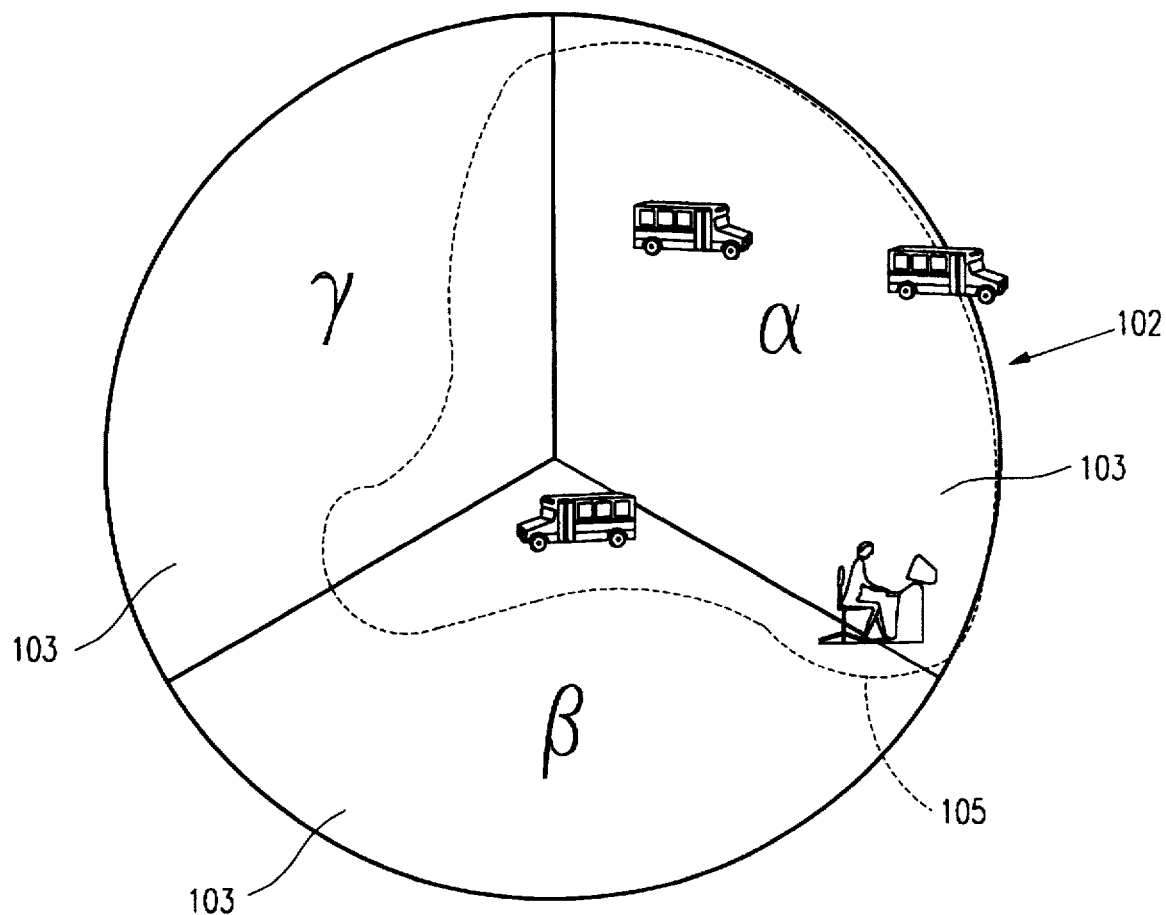
FIG. 2 illustrates one sectored cell from among the sectored cells of FIG. 1.
Figure 3:
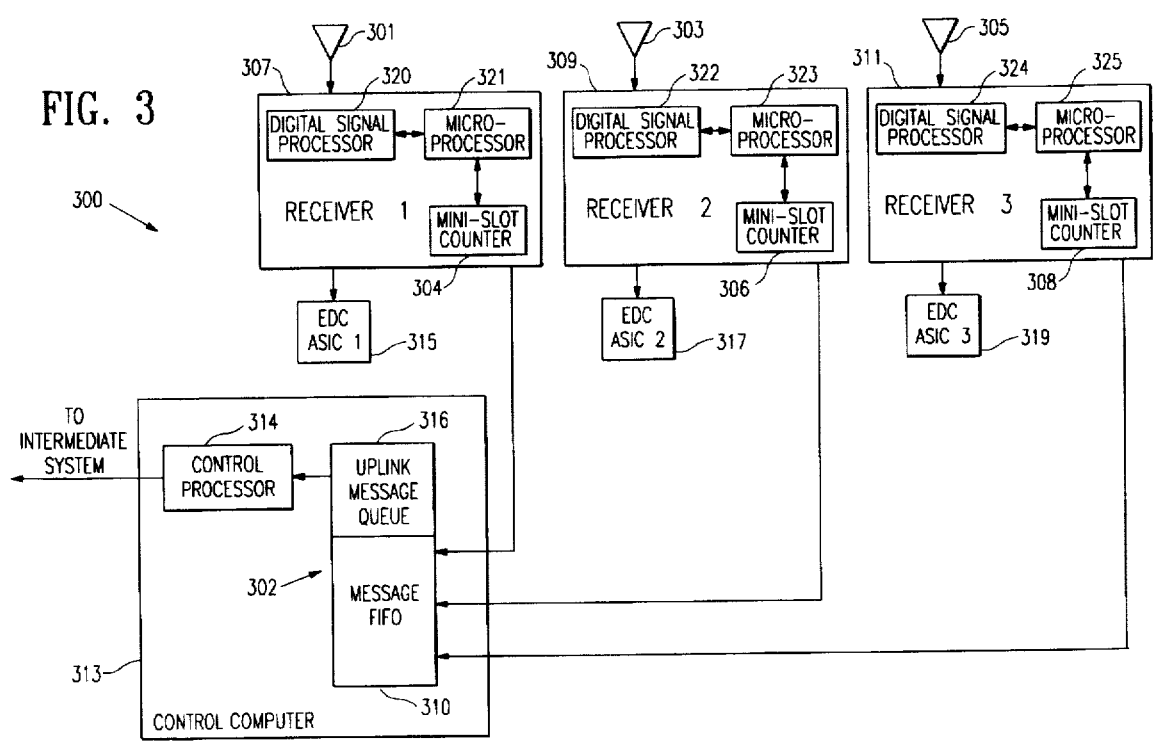
FIG. 3 is a block diagram of a base station in accordance with one embodiment of the present invention.

The present invention is a method and apparatus for improving the signal-to-interference ratio of signals transmitted from a point source on a reverse channel within a mobile communication system (e.g., from a mobile end system to a base station). The heart of the present invention lies in the use of sectored receive antennas (i.e., directional antennas) which each attempt to receive the same channel from a different one of a plurality of directions. The use of directional antennas attempting to receive the same channel increases the signal-to-interference ratio of the output from the receiver by increasing the antenna gain for signals originating within the sector, while reducing the antenna gain for sources of interference which are not within the main lobe of the antenna. Furthermore, since use of directional antennas provides higher signal gain, the average signal-to-noise ratio is greater, which can be important in systems that are constrained by limited mobile end system transmitter power. FIG. 3 is a block diagram of a base station 300 in accordance with one embodiment of the present invention. In accordance with the embodiment of the present invention shown in FIG. 3, three directional receive antennas 301, 303, 305 are provided. Each of the receive antennas 301, 303, 305 are coupled to an associated unique receiver 307, 309, 311. The three receivers 307, 309, 311 are preferably identical. Each receiver preferably includes a digital signal processor (DSP) 320, 322, 324, a processor (such as a conventional microprocessor) 321, 323, 325, and a micro-slot counter 304, 306, 308. Signals received over each of the antennas 301, 303, 305 are processed in conventional fashion by each of the associated receivers 307, 309, 311. It will be understood by those of ordinary skill in the art that three antennas are shown only as an example of the present invention, and that any number of receive antennas greater than one may be used in accordance with the present invention. Preferably, an associated receiver is provided for each receive antenna.

In accordance with one embodiment of the present invention in which the base station 300 receives digital packet data (such as is the case in a Cellular Digital Packet Data (CDPD) or a Personal Communication System(PCS)base station), the output from each of the receivers 307,309,311 is a digital data stream organized as blocks of reverse channel receive data. In accordance with one embodiment of the present invention, receipt of each block of reverse channel receive data (i.e., each "message") is synchronized to the start of a time slot, referred to as a "micro-slot". Each micro-slot is identified by a "micro-slot count" which is determined by the micro-slot counter 304, 306, 308. Upon receipt of a message, the current micro-slot count is appended by the receiver 307, 309, 311 to the message to identify generally when the message was received. Each micro-slot counter 304, 306, 308 is synchronized with each other micro-slot counter at regular intervals to ensure that the same micro-slot count is appended to each message received within the same micro-slot of time. In accordance with one embodiment of the present invention, each micro-slot is approximately ½ the time required to received one message. In the preferred embodiment of the present invention, in any given micro-slot, if no receiver is currently receiving a message, all receivers attempt to detect a message. If one or more receivers detect a message in a given micro-slot, those receivers begin demodulating and decoding the messages they have detected. If any receivers did not detect a message during the given micro-slot in which one or more receivers did detect a message, those receivers cease attempting to detect messages until each of the receivers that had detected a message has completed receiving the detected message. Therefore, unless messages arrive at more than one receiver within the same micro-slot, only one message can be received at a given time. Since messages last for at least 7 micro-slots, messages that are not received in the same micro-slot must begin at times separated by at least 7 micro-slots.

Once a message has been demodulated by the receiver 307, 309, 311, an essentially conventional error correcting and detecting decoding (ECDD) function is performed which detects and corrects errors in the message. The ECDD function can be accomplished either with dedicated hardware or software, or using the processing capability available in one or more of the other devices which are present in the base station. For example, in the preferred embodiment, the ECDD function is accomplished by a combination of the DSP 320, 322, 324 within the particular receiver 307, 309, 311 that received the message and an application specific integrated circuit (ASIC) associated with that receiver. In one embodiment of the present invention, an interleaved convolutional code is used for error correction. A 32 bit cyclic redundancy check (CRC) code is preferably used to detect whether there are any residual errors remaining after decoding the interleaved convolutional code. It will be understood by those skilled in the art that in an alternative embodiment any other method for performing error correcting and detecting decoding may be used.

If the ECDD function determines that the decoded message is error-free, then a "Decode Successful" indication is asserted and the message is placed in a buffer within the DSP 320, 322, 324. Each successfully decoded message is transferred from the DSP buffer to a control computer 313. In the preferred embodiment of the present invention, the control computer 313 includes a control processor 314, such as a programmable device and memory 302. However, the control processor 314 may be any circuit or device which is capable of performing the functions described below, such as a circuit including discrete logic devices, an ASIC, or a state machine. In one embodiment of the present invention, the functions of the control computer 313, each receiver 307, 309, 311, and each ECDD function may be performed by one multi-tasked processor. In accordance with another embodiment of the present invention, the functions performed by the control computer 313, each receiver 307, 309, 311, and each ECDD function may be divided among two or more processors. In such an embodiment, one such processor may be specially suited to performing digital signal processing and another specially suited to performing control functions. It will be understood by those skilled in the art that the particular assignment of these functions to hardware devices is not to be limited by the particular examples of embodiments presented herein.

Within the memory 302 a "Message FIFO" 310, and an Uplink Message Queue 316 are established. The Message FIFO 310 receives each error-free message. Upon determining that the message is not redundant with another message previously processed, the message is transferred to the Uplink Message Queue 316 from which the message is sent to a central router for the wireless system, commonly referred to as an Intermediate System. A first pointer indicates the address at which the next message is to be stored, and a second pointer indicates the address of the next message to be processed by the control processor 314. Messages are preferably stored in the Message FIFO 310 in the order in which they are received by the control computer 313. Therefore, messages which are received during the same micro-slot will be stored in adjacent address locations within the Message FIFO.

In accordance with the preferred embodiment of the present invention, the control processor 314 within the control computer 313 reads each of the messages from the Message FIFO 310 in the order in which the messages were received from each receiver 307, 309, 311. Therefore, each message received during the same micro-slot will be read from the Message FIFO 310 one after another. When the first message is read from the Message FIFO 310, the micro-slot count of that message is stored in a "Current Micro-slot Count" register. The first message read from the Message FIFO 310 having a new micro-slot count is always sent to the Uplink Message Queue 316 for transmission to the Intermediate System. In one embodiment of the present invention, the Message Queue 316 is formed by tagging each message within the Message FIFO 310 that has been approved by the control computer for transmission to the Intermediate System. Therefore, the same memory is used for both the Message FIFO 310 and the Uplink Message Queue 316.

After processing the first message, the next message is read from the Message FIFO 310. If the micro-slot count which was appended to the second message is the same as the micro-slot count appended to the first message, then the control processor 314 compares the second current message to each of the messages within the Uplink Message Queue (i.e., each of the previously processed messages having the same micro-slot count). In the case of the second message, the only other message in the Uplink Message Queue 316 is the first message.

If the second message is the same as any other message (i.e., the first message), then the second message is discarded. Otherwise, the second message is placed in the Uplink Message Queue. The next message is then read from the message FIFO 310. When the micro-slot count of the message currently being read differs from the micro-slot count held in the micro-slot register, each of the messages currently in the Uplink Message Queue 316 are sent to the Intermediate System (i.e., the Uplink Message Queue 316 is emptied), and the current message is placed in the Uplink Message Queue 316. The micro-slot register is then updated with the value of the micro-slot count associated with the current message. This process is repeated for each message within the Message FIFO 310 and continues on an ongoing basis as new messages are received.

In accordance with the preferred embodiment of the present invention, each micro-slot is relatively long. For example, in one embodiment of the present invention, each micro-slot is approximately 1/7 the length of a message (i.e., about 7.5 msec. in the preferred embodiment of the present invention). In accordance with one embodiment of the present invention in which (1) the delay between the time a message is received at the receiver and the time the message is received at the control computer 313 is relatively consistent from message to message and from receiver to receiver, and (2) the busy/idle flag indicates busy relatively soon after receipt by any receiver 307, 309, 311 of the beginning of a message, messages will either be received by the control computer 313 in the same micro-slot, or will be spaced seven micro-slots apart. In accordance with one embodiment of the present invention, the control processor 314 waits one full micro-slot after receiving a message from the ECDD function before determining whether more than one copy of the message has been received. If any other messages have been received within that time, the control processor 314 compares each such message with each other such message. Only one of the copies of each message is sent to the Intermediate System. The control processor 314 then awaits receipt of the next set of messages, which can be expected to be received no sooner than 6 more micro-slots of time later. In an alternative embodiment, the control processor 314 waits two or more micro-slots after receipt of a message to ensure that all other messages that were received by a receiver within the same micro-slot have been received by the control computer 313. After this delay, all messages which are unique from one another are sent to the Intermediate System (or placed in an Uplink Message Queue 316 for transmission to the Intermediate System at some later time) and the message FIFO 310 is cleared. Waiting more than one micro-slot ensures that any differences in processing delays encountered by messages received by different receivers 307, 309 and 311 will be considered in determining that all message received within the same micro-slot have been received by the control computer 313.

In another alternative embodiment of the present invention, each receiver time stamps each received message and writes the time stamped message into the Message FIFO 310 within the control computer 313. This time stamp may be used in systems in which messages are received asynchronously (i.e., no micro-slots are defined). In yet another embodiment, once the arrival of a message has been marked in time, the control processor 314 reads the messages from the Message FIFO 310 and determines the source of the message by parsing the message to read a source identification code from the message. The control processor 314 checks the Uplink Message Queue 316 to determine whether another message with the same source identification code and either the same micro-slot count or a time stamp within a predetermined range of time was previously received. If there is an entry in the Uplink Message Queue 316 which has the same source identification code and which was received essentially at the same time, then the message most recently stored in the Message FIFO 310 is discarded as redundant. If instead there is no such entry in the Queue 316 then a new entry including the source identification code and either the time stamp or the micro-slot count is entered into the Uplink Message Queue 316 and the message is sent to the intermediate system by the control computer 313 using an appropriate protocol procedure. If the control computer 313 determines that another message was received within the predetermined time range, but that the other message was not sent from the same mobile end system (i.e., the micro-slot count or time stamps match, but the source identification code does not), then both messages are preferably placed in the Queue 316.

The preferred embodiment of the present invention uses the well-known Digital Sense Multiple Access with Collision Detect (DSMA/CD) channel access scheme to arbitrate access to the reverse channel. In accordance with DSMA/CD, if the base station 300 detects any mobile end system transmission on the reverse channel, it asserts a periodically occurring flag, called a "busy/idle" flag, on the forward channel to indicate that the channel is busy. Any mobile end system that is transmitting when the busy/idle flag is set to indicate busy may continue to transmit, but other mobile end systems desiring access to the channel must wait to transmit until the busy/idle flag is cleared to indicate that the channel is idle. A second flag on the forward channel (referred to as the "decode status" flag) indicates whether the block received by the base station 300 was determined to be error free after the error correcting decoding was completed. In the preferred embodiment of the present invention, the forward channel is transmitted using one omni-directional antenna. Therefore, a single transmission of either the busy/idle flag or the decode status flag indicates the composite status for all receivers in the base station. If any of the three receivers detect a mobile end system's transmission, the busy/idle flag is set to indicate busy, preventing other mobile end systems from transmitting. Similarly, if any of the three receivers successfully decodes a message, the decode status flag is set to indicate success.

At times, two (or more) mobile end systems may sense at the same time that the channel is idle and simultaneously begin transmission. In this case, a collision occurs. In existing systems, when a collision occurs, one of two things happens; most commonly each signal is received at a comparable signal level. Therefore, base station 300 is unable to successfully decode any of these signals because each interfere with each other too severely. In this case, the base station 300 sets the decode status flag to indicate a decode failure. When each mobile end system receives a failure flag, each mobile end system assumes that a collision has occurred and ceases transmitting. Each mobile end system then waits a randomly chosen amount of time and attempts to access the channel again, beginning by testing whether the channel is idle.

Less commonly, one of the signals is received by the base station 300 at a much stronger level than any others. In this case, the weaker signals may not interfere with the strongest signal enough to prevent its successful decoding. In this case, the base station 300 indicates decode success, and each mobile end system assumes that its transmission was successful. However, higher layers of communication network protocol will fail to provide an acknowledgment to any mobile end system with a weaker signal. The mobile systems with the weaker signals eventually will determine that the transmission failed and each such mobile system will retransmit the failed message. However, it is not possible to receive more than one error free signal at a time, since signals which are sufficiently strong to be demodulated without error will surely interfere with any other signals that are being received simultaneously.

In a sectored base station in accordance with the present invention, either of these two conditions may occur. Additionally a third condition is possible. That is, each mobile end system may be located in a position that produces a signal on at least one antenna that is much stronger than any potentially interfering signal. When this happens, it is possible that two or more simultaneously transmitted signals from separate mobile end systems will be successfully decoded. As long as at least one message decodes successfully, the base station 300 sets the decode status flag to indicate success in decoding the message. All successfully decoded messages are then routed by the control computer 313 to the intermediate system, even if they were received simultaneously. If a message from a first mobile end system transmission cannot be decoded successfully, the lack of an acknowledgment from the higher layer of the communication network protocol will eventually result in the failing mobile end system retransmitting the failed message.

In an alternative embodiment of the present invention, pointers and indicators are used to implement an ID FIFO buffer 312 and a Message FIFO 310. FIG. 4 is an illustration of a section of memory 302 within the control computer 313. A "Store Next Message" pointer 401, a "Read Next" pointer 403, a "Check Indicator" pointer 404, an "End of ID List" pointer 405, and a Message Sent indicator 407 are used to determine whether duplicate messages have been received.

Each time a new message is received from one of the receivers 307, 309, 311 the message is stored at the address indicated by the Store Next pointer 401 and the Store Next pointer 401 is incremented to point to the next address location within the memory 302. Messages to be read by the control processor 314 are taken from an address indicated by the Read Next pointer 403. The control processor 314 then reads the Message Sent indicator 407 associated with an address indicated by the Check Indicator pointer 404. If the Message Sent indicator 407 is not asserted, then the Check Indicator pointer 404 is decremented and the Message Sent indicator 407 associated with the address indicated by the Check Indicator pointer 404 is read. This process is repeated until either a Message Sent indicator 407 is found which is asserted, or the address of the Check Indicator pointer 404 is equal to the address of the End of ID List pointer 405. If a Message Sent indicator 407 is found which is asserted, then the time stamp and Source Identification Code of the message stored at the address of the Check Indicator pointer 404 is compared with the time stamp and Source Identification code of the message stored at the location indicated by the Read Next pointer 403.

If the difference between the two time stamps is within a predetermined range, and the Source Identification codes stored in each entry are the same, then the message stored at the address indicated by the Read Next pointer 403 is was already sent to the intermediate system, and the message stored at the address indicated by the Read Next pointer 403 is discarded. The Message Sent indicator 407 stored at the address indicated by the Read Next pointer 403 is then deasserted.

If the difference between the two time stamps is not within the predetermined range, then the Check Indicator pointer 404 is decremented and the control processor 314 checks whether the Check Indicator pointer 404 is equal to the End of ID List pointer 405. If not, then the Message Sent indicator 407 associated with the new address indicated by the Check Indicator pointer 404 is tested. If the Check Indicator pointer 404 is asserted, the computer controller 313 compares the time stamp and Source Identification code stored at the address pointed at by the Read Next pointer 403 against the messages stored at the address indicated by the Check Indicator pointer 404. If the Check Indicator pointer 404 is equal to the End of ID List pointer (i.e., none of the messages stored between the Read Next pointer 403 and the End of ID List pointer 405 have both the Message Sent indicator asserted and a time stamp within the predetermined range of the time stamp of the message stored at the Read Next pointer 403), then the Message Sent indicator 407 associated with the message at the address indicated by the Read Next pointer 403 is asserted. The message at the address indicated by the Read Next pointer 403 is then communicated to the intermediate system.

Once the state of the Message Sent indicator 407 stored at the address indicated by the Read Next pointer 403 has been determined, the Read Next pointer 403 and the End of ID List pointer are each incremented and the process repeats for the next received message until there are no more received messages (i.e., the Read Next pointer 403 and the Store Next pointer 401 are equal). The values of the FIFO 310 and the associated indicators stored at addresses below the End of ID List pointer 405 are irrelevant. Therefore, as the End of ID List pointer 405 moves upward, the address previously pointed to becomes irrelevant. Thus, memory locations stored at addresses below the end of the ID List pointer 405 can be reused by wrapping the Store Next pointer 401 around to the bottom of the memory 302 upon reaching the top of the memory 302. It should be understood even thought the process is described in terms of steps which are performed in order, processing steps such as receipt of one message and the processing of another message, may be performed concurrently in the present invention whenever practical.

In another alternative embodiment of the present invention, each message sent from a mobile end system is received with a source identification code which identifies the source of the message. In addition, each message may be received with a message identification code that is unique to that message. In order to reduce the number of bits required for such a message identification code, the message identification codes may be repeated at predetermined intervals, such as every second. In the embodiment in which a unique message identification code is transmitted by the mobile end system with each message, the determination is made by comparing a message identification code of each message. No time stamps are required in such embodiments. If only a source identification code is present, then either a time stamp, or the micro-slot count together with the source identification code will provide a means for clearly determining whether one received message is the same as another.

In accordance with another embodiment of the present invention in which the messages which are received by each receiver 307, 309, 311 are not digital, no error correcting and detecting decoding is possible. Nonetheless, the control computer 313 can determine whether the same message is being received by more than one sector of the base station 300 by comparing a modulation pattern embedded in the message. Upon a determination that the same message is being received by more than one receiver, the control computer 313 selects which signal is to be coupled to the intermediate system based upon an output from each receiver 307, 309, 311 which indicates whether a signal is present, such as a carrier detect signal, and further based upon the signal quality of each received signal. The signal having the highest quality is selected. A determination as to which signal has the highest quality may be based upon signal strength, signal-to-interference ratio, or any other commonly used quality metric.

By using a sectored base station receiver in which each receiver of the base station receives the same channel(s), the present invention allows the base station to take advantage of the benefits which come from using a directional antenna (e.g., reduced signal-to-interference and increased signal-to-noise ratio) in a narrow band application without having to assign different frequencies to each sector. Furthermore, in the preferred embodiment of the present invention, the transmitter is coupled to an omni-directional antenna in order to reduce the number of antennas required and thereby simplify the system requirements.

Summary

A number of embodiments of the present invention have been described. Nevertheless, it will be understood that various modifications may be made without departing from the spirit and scope of the invention. For example, the present invention may be used in communication systems which have an adequate number of channels to assign different channels to each directional antenna within a sectored cell. Furthermore, any method may be used to determine when signals received at multiple sectors within the same cell are the same. Still further, in accordance with the present invention, any number of sectors greater than one may be used within a cell. Furthermore, the ECDD function is described as being performed by an ASIC. However, it will be clear to those skilled in the art that the ECDD function may be considered to be included within each receiver or as an independent component of the system. Still further, the control computer may be any mechanism which is capable of determining whether the information received on one antenna is the same as the information received on another antenna. Accordingly, it is to be understood that the invention is not to be limited by the specific illustrated embodiment, but only by the scope of the appended claims.

We claim:

1. A method for improving the signal quality of signals received at a base station including the steps of:
   (a) receiving messages concurrently on a plurality of directional antennas, at least one of the antennas having a main lobe that is off axis from the main lobe of at least one other such antenna,
   (b) determining whether any of the concurrently received messages are the same;
   (c) discarding all but one of the messages determined to be same; and
   (d) communicating the undiscarded messages to an external device.

2. A base station including:
   (a) at least two directional antennas having their main lobes off axis from one another;
   (b) at least two receivers, each receiver associated with, and coupled to, a corresponding one of the at least two antennas each receiver tuned to the same receive channel for receiving messages; and
   (c) a control computer, coupled to each of the receivers, for receiving messages from each receiver and determining whether the received messages are duplicative.

3. The base station of claim 2, wherein each receiver time stamps each received message with a time stamp indicating approximately the time the message was received.

4. The base station of claim 2, wherein each message includes information uniquely identifying that message.

5. The base station of claim 2, wherein the received messages are encoded using error correcting and detecting codes.

6. The base station of claim 5, wherein the control computer detects and corrects errors based upon the error correcting and detecting codes.

7. The base station of claim 5, wherein the receiver performs error correcting decoding and the control computer performs error detecting decoding.

8. The base station of claim 5, wherein the receivers couple each received message to the control computer only if a message to be coupled to the control computer is error free after decoding the error correcting and detecting codes.

9. The base station of claim 2, wherein the control computer includes:
   (a) a memory;
   (b) a store next pointer for identifying an address within the memory at which a next received message is to be stored;
   (c) a read next message pointer for identifying an address within the memory from which the next read message is to be read;
   (d) a check indicator pointer for identifying an address at which a message is stored for which a decision has already been made to send or discard the message;
   (e) an end of ID List pointer for identifying a last address at which a message is stored for which a decision has already been made to send or discard the message and which is to be considered in making the determination as to whether or not to send the read message.

10. The base station of claim 9, wherein the memory includes a message sent indicator stored within the memory in association with each message stored between the address of the check indicator pointer and the end of ID List pointer, inclusive of these two addresses.

11. The base station of claim 2, wherein the control computer includes:
   (a) a message memory in which received messages may be stored; and
   (b) a processor for:
      (1) comparing each newly received message with each message stored in the message memory to determine whether the newly received message is the same as any of the stored messages;
      (2) if the newly received message is the same as one of the stored messages, then discarding the newly received message;
      (3) if the newly received message is not the same as any of the stored messages, then storing the newly received message in the message memory; and
      (4) communicating each of the stored messages to an external device.

12. The base station of claim 1, further including at least two error detecting decoding circuits, each error detecting decoding circuit being associated with, and coupled to, a corresponding receiver.

13. The base station of claim 11, wherein the external device is a central routing station.

14. The base station of claim 11, wherein the message memory is a first-in-first-out (FIFO) memory.

15. The base station of claim 11, wherein each receiver time stamps each received message with a time stamp indicating approximately the time the message was received.

16. The base station of claim 15, wherein the processor compares each newly received time stamped message with only messages in the message memory having a time stamp indicating that the message to be compared was received within a predetermined range of the time which includes the time at which the newly received message was received.

17. The base station of claim 2, where the control computer includes:
   (a) a message memory; and
   (b) a processor for:
      (1) comparing the identifying information of each newly received message with the identifying information of messages in the message memory;
      (2) if the identifying information of newly received message is the same as the identifying information of any message stored within the message memory, then discarding the newly received message;

(3) if the identifying information of the newly received message is not the same as the identifying information of the messages stored within the message memory, then storing the newly received message; and (4) communicating each of the stored messages to an external device.

18. The base station of claim 17, wherein the message memory is a first-in-first-out (FIFO) memory.

19. The base station of claim 17, wherein the receiver performs error correcting decoding and the control computer performs error detecting decoding.

20. The base station of claim 17, wherein the control computer detects and corrects errors based upon the error correcting and detecting codes.

21. The base station of claim 17, wherein the external device is a central routing station.

22. The base station of claim 17, wherein the processor compares the identifying information of each newly received time stamped message with only the identifying information of messages in the message memory having a time stamp that indicates that the message to be compared was received within a predetermined range of the time which includes the time at which the newly received message was received.

23. A base station, including:

(a) at least two directional antennas having their main lobes off axis from one another;

(b) at least two receivers, each receiver associated with, and coupled to, a corresponding one of the at least two antennas, each receiver tuned to the same receive channel for receiving messages; and (c) a control computer, coupled to each of the receivers, for receiving in the control computer the received messages from each receiver, detecting whether said messages are duplicates, and selecting from among the duplicate messages received within a predetermined range of times, one of the received duplicate messages to be coupled to an external device.

24. The base station of claim 23, wherein the control computer selects the duplicate message to be coupled to the external device based upon the quality of each of the received messages.

25. The base station of claim 23, wherein each receiver time stamps each message with an indication of the approximate time the message was received by the receiver.

26. The base station of claim 25, wherein the control computer includes:

(a) a message memory;

(b) a processor for:
  (1) comparing the quality of each newly received time stamped message with the quality of messages in the message memory;
  (2) if the newly received message does not have higher quality than each of the messages to which the newly received message is compared, then discarding the newly received message;
  (3) if the newly received message has higher quality than any of the messages to which the newly received message is compared, then storing the newly received message and discarding each message to which the newly received message was compared; and
  (4) communicating to an external device each of the messages which remain stored in the message memory.

27. The base station of claim 26, wherein the processor compares the quality of each newly received time stamped message with only the quality of messages in the message memory having a time stamp that indicates that the message to be compared was received within a predetermined range of the time which includes the time at which the newly received message was received.

28. The base station of claim 26, wherein the control computer communicates each of the messages which remain stored in the message memory at the end of each predetermined time.

29. The base station of claim 26, wherein each receiver determines the signal quality of each received message and communicates the signal quality together with the message to the control computer.

30. The base station of claim 26, wherein each receiver determines the signal quality of each received message as a function of received signal strength.

31. The base station of claim 26, wherein each receiver determines the signal quality of each received message as a function of bit error rate.

32. The base station of claim 26, wherein each receiver determines the signal quality of each received message as a function of symbol error rate.

33. The base station of claim 26, wherein each receiver determines the signal quality of each received message as a function of signal-to-interference ratio.

34. The base station of claim 26, wherein each receiver determines the signal quality of each received message as a function of signal-to-noise ratio.

35. The base station of claim 25, wherein the control computer includes:

(a) a message memory for storing received messages;

(b) a processor for:
  (1) comparing the quality of each newly received time stamped message with the quality of messages stored in the message memory
  (2) if the newly received message does not have higher quality than each of the messages stored within the message memory, then discarding the newly received message;
  (3) if the newly received message has higher quality than all of the messages to which the newly received message is compared, then storing the newly received message and discarding each message to which the newly received message was compared; and
  (4) communicating to an external device each of the messages which remain stored in the message memory.

36. The base station of claim 35, wherein the control computer compares only messages which have a time stamp indicating that the message to be compared was received within a predetermined range of time, the predetermined range of time including the time at which the newly received message was received.

37. The base station of claim 35, wherein the control computer communicates each of the messages which remain stored in the message memory at the end of each predetermined time.

38. The base station of claim 35, wherein the external device is a voice mobile telephone switching office.

39. The method of claim 23, wherein the control computer detects whether said messages are duplicates based upon the messages originating at the same transmitter.

* * * * *